US011676032B2

(12) United States Patent
Le Moing et al.

(10) Patent No.: US 11,676,032 B2
(45) Date of Patent: Jun. 13, 2023

(54) SIM-TO-REAL LEARNING OF 2D MULTIPLE SOUND SOURCE LOCALIZATION

(71) Applicant: INTERNATIONAL BUSINESS MACHINES CORPORATION, Armonk, NY (US)

(72) Inventors: Guillaume Jean Victor Marie Le Moing, Montbonnot Saint Martin (FR); Don Joven Ravoy Agravante, Tokyo (JP); Phongtharin Vinayavekhin, Tokyo (JP); Jayakorn Vongkulbhisal, Tokyo (JP); Tadanobu Inoue, Kanagawa (JP); Asim Munawar, Ichikawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 458 days.

(21) Appl. No.: 16/804,806

(22) Filed: Feb. 28, 2020

(65) Prior Publication Data

US 2021/0271978 A1    Sep. 2, 2021

(51) Int. Cl.
*G06N 3/084* (2023.01)
*G10L 25/51* (2013.01)
(Continued)

(52) U.S. Cl.
CPC .............. *G06N 3/084* (2013.01); *G06N 3/044* (2023.01); *G10L 25/51* (2013.01); *H04R 1/406* (2013.01); *H04R 3/005* (2013.01)

(58) Field of Classification Search
CPC ...... G06N 3/084; G06N 3/0445; G10L 25/51; H04R 1/406; H04R 3/005
See application file for complete search history.

(56) References Cited

U.S. PATENT DOCUMENTS

2017/0325023 A1   11/2017  Nongpiur
2021/0345039 A1*  11/2021  Le Moing .............. G06N 3/045

FOREIGN PATENT DOCUMENTS

CN         11066472 A  *  7/2021  ............. G10L 13/08
WO   WO2018184187 A1     10/2018

OTHER PUBLICATIONS

Learning Multiple Sound Source 2D Localization (Year: 2019).*
(Continued)

*Primary Examiner* — Mohammad K Islam
(74) *Attorney, Agent, or Firm* — Tutunjian & Bitetto, P.C.; Randy Emilio Tejeda (57) ABSTRACT

A computer-implemented method is provided for training a multi-source sound localization model using labeled simulation data and unlabeled real data. The method includes inputting the labeled simulation data and the unlabeled real data respectively into a multi-source sound localization model of a neural network to obtain a localization heatmap from an output layer of the multi-source sound localization model for each of the labeled simulation data and the unlabeled real data. The method further includes inputting the localization heatmap for each of the labeled simulation data and the unlabeled real data into an output discriminator. The method also includes training the output discriminator so that the output discriminator assigns a domain class label to distinguish simulation data from real data. The method additionally includes training, by a hardware process, the multi-source sound localization model by a first adversarial loss for the output discriminator with an original localization model loss.

19 Claims, 9 Drawing Sheets

(51) Int. Cl.
H04R 3/00 (2006.01)
H04R 1/40 (2006.01)
G06N 3/044 (2023.01)

(56) References Cited

OTHER PUBLICATIONS

Adaptation of Multiple Sound Source Localization Neural Networks with Weak Supervision and Domain-adversarial Training (Year: 2019).*
Deep Ranking-Based Sound Source Localization (Year: 2019).*
Sinusoidal wave generating network based on adversarial learning and its application: synthesizing frog sounds for data augmentation (Year: 2019).*
Adversarial Deep Domain Adaptation for Multi-Band SAR Images Classification (Year: 2019).*
Active Learning for Efficient Audio Annotation and Classification With a Large Amount of Unlabeled Data (Year: 2019).*
Ben-David et al., "A Theory of Learning from Different Domains", Mach Learn (2010), Oct. 2009, pp. 151-175.
Ganin et al.,"Domain-Adversarial Training of Neural Networks", Journal of Machine Learning Research 17 (2016), pp. 1-35, Apr. 2016.
Mell et al. "The NIST Definition of Cloud Computing", NIST Special Publication 800-145, 2011, 7 pages.
Sekiguchi et al., "Online Simultaneous Localization and Mapping of Multiple Sound Sources and Asynchronous Microphone Arrays", 2016 IEEE/RSJ International Conference on Intelligent Robots and Systems (IROS), Oct. 2016, pp. 1973-1979.
Suvorov et al., "Deep Residual Network for Sound Source Localization in the Time Domain", arxiv.org, Aug. 2018, 12 pages.
Vera Diaz et al., "Towards End-to-End Acoustic Localization Using Deep Learning: From Audio Signals to Source Position Coordinates", Sensors 2018, Oct. 2018, 28 pages.
Yalta et al., "Sound Source Localization Using Deep Learning Models", Article in Journal of Robotics and Mechatronics 29(1):37-48 Feb. 2017, 1 page.
Le Moing et al., "Learning Multiple Sound Source 2D Localization", 2019 IEEE 21st International Workshop on Multimedia Signal Processing (MMSP), Sep. 2019, 6 pages.
Le Moing et al.,"Sim-to-Real Learning of Sound Source Localization", Robotics Society of Japan 2019, Sep. 2019, 2 pages.
Le Moing et al.,"Domain Adaptation For Multiple Sound Source 2d Localization", ICASSP 2020, Mar. 2020, 5 pages.

* cited by examiner

SIM-TO-REAL LEARNING OF 2D MULTIPLE SOUND SOURCE LOCALIZATION

BACKGROUND

The present invention generally relates to artificial intelligence, and more particularly to sim-to-real learning of two-dimension (2D) multiple sound source localization using adversarial domain adaptation with discrimination ensemble.

2D Sound Source Localization (SSL) is a problem in audio signal processing to identify the 2D Cartesian coordinates of sound sources in an enclosed environment(s) by using multiple microphone arrays. However, there is a need for labeled data in order to solve this problem.

SUMMARY

According to an aspect of the present invention, a computer-implemented method is provided for training a multi-source sound localization model using labeled simulation data and unlabeled real data. The method includes inputting the labeled simulation data and the unlabeled real data respectively into a multi-source sound localization model of a neural network to obtain a localization heatmap from an output layer of the multi-source sound localization model for each of the labeled simulation data and the unlabeled real data. The method further includes inputting the localization heatmap for each of the labeled simulation data and the unlabeled real data into an output discriminator. The method also includes training the output discriminator so that the output discriminator assigns a domain class label to distinguish simulation data from real data. The method additionally includes training, by a hardware process, the multi-source sound localization model by a first adversarial loss for the output discriminator with an original localization model loss.

According to another aspect of the present invention, a computer program product is provided for training a multi-source sound localization model using labeled simulation data and unlabeled real data. The computer program product includes a non-transitory computer readable storage medium having program instructions embodied therewith. The program instructions are executable by a computer to cause the computer to perform a method comprising. The method includes inputting the labeled simulation data and the unlabeled real data respectively into a multi-source sound localization model of a neural network to obtain a localization heatmap from an output layer of the multi-source sound localization model for each of the labeled simulation data and the unlabeled real data. The method further includes inputting the localization heatmap for each of the labeled simulation data and the unlabeled real data into an output discriminator. The method also includes training the output discriminator so that the output discriminator assigns a domain class label to distinguish simulation data from real data. The method additionally includes training the multi-source sound localization model by a first adversarial loss for the output discriminator with an original localization model loss.

According to yet another aspect of the present invention, a computer processing system is provided for training a multi-source sound localization model using labeled simulation data and unlabeled real data. The computer processing system includes a memory device including program code stored thereon. The computer processing system further includes a hardware processor, operatively coupled to the memory device, and configured to run the program code stored on the memory device to input the labeled simulation data and the unlabeled real data respectively into a multi-source sound localization model of a neural network to obtain a localization heatmap from an output layer of the multi-source sound localization model for each of the labeled simulation data and the unlabeled real data. The hardware processor is further configured to run the program code to input the localization heatmap for each of the labeled simulation data and the unlabeled real data into an output discriminator. The hardware processor is also configured to run the program code to train the output discriminator so that the output discriminator assigns a domain class label to distinguish simulation data from real data. The hardware processor is additionally configured to run the program code to train the multi-source sound localization model by a first adversarial loss for the output discriminator with an original localization model loss.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to sim-to-real learning of 2D multiple sound source localization using adversarial domain adaptation with discrimination ensemble.

One or more embodiments of the present invention propose leveraging simulation data for the Sound Source Localization (SSL) problem.

One or more embodiments propose the use of Adversarial Domain Adaptation to learn from using labeled simulation data and unlabeled real data.

One or more embodiments employ an effective improvement of using multiple discriminators, e.g., one in the intermediate layers and one in the output layer. The intermediate discriminator adapts the latent features to be indistinguishable between domains. The output discriminator adapts the heatmap to be indistinguishable between domains.

Figure 1:
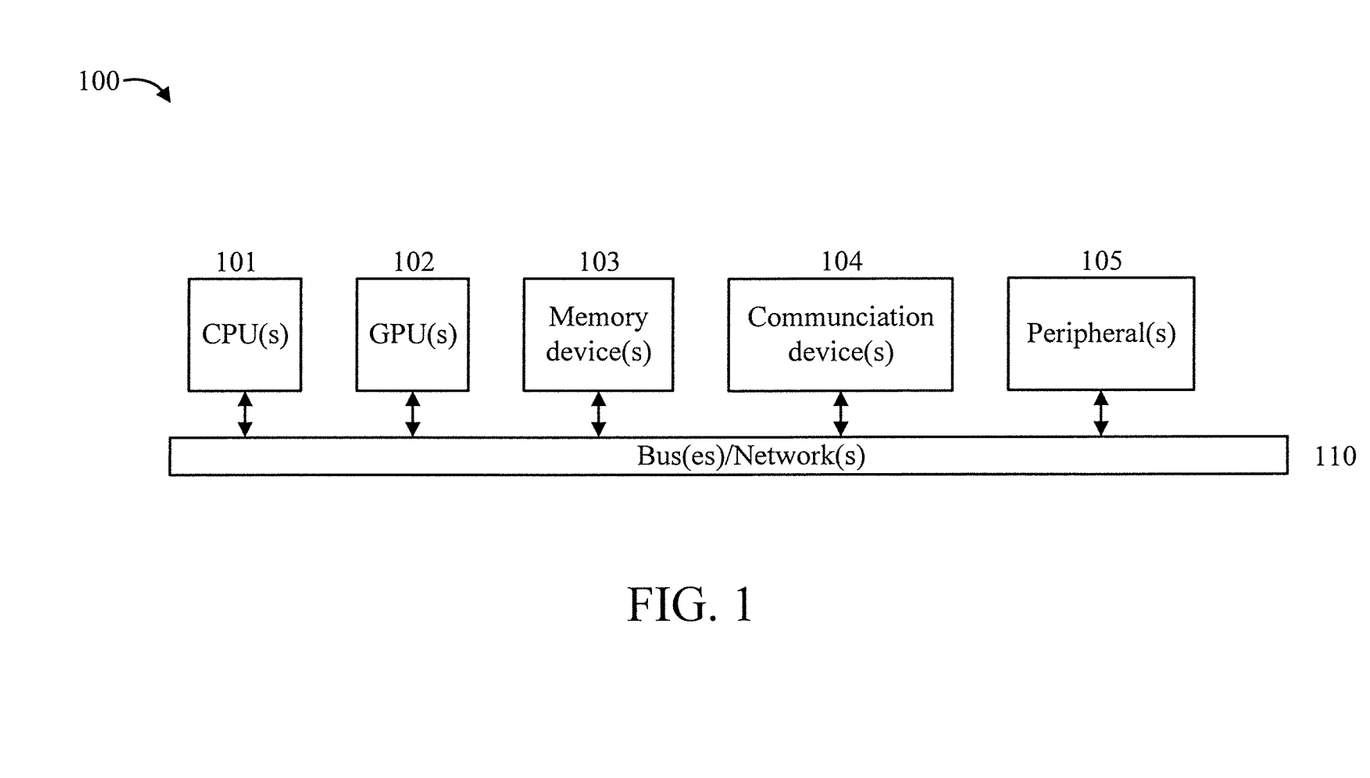
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, the memory devices 103 include a sim-to-real learning neural network 103A trained in accordance with one or more embodiments of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 8-9). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "hardware processor subsystem" or "hardware processor" in short refers to a processor, memory, and software combination that cooperate to perform one or more specific tasks. In an embodiment, the hardware processor subsystem can include one or more data processing elements (e.g., logic circuits, etc.). In an embodiment, the one or more data processing elements can be included in a central processing unit, a graphics processing unit, and/or a separate processor or computing element-based (e.g., logic gates, etc.) controller. In an embodiment, the hardware processor subsystem can include one or more on-board memories (e.g., caches). In an embodiment, the hardware processor subsystem can include one or more other memories (e.g., ROM, RAM, BIOS). In an embodiment, the hardware processor subsystem can include and execute one or more software applications. In an embodiment, the one or more software applications can include the operating system and/or one or more other applications and/or specific code to achieve a specified result. These and other variations of a hardware processor subsystem are readily determined given the teachings of the present invention provided herein.

Figure 2:
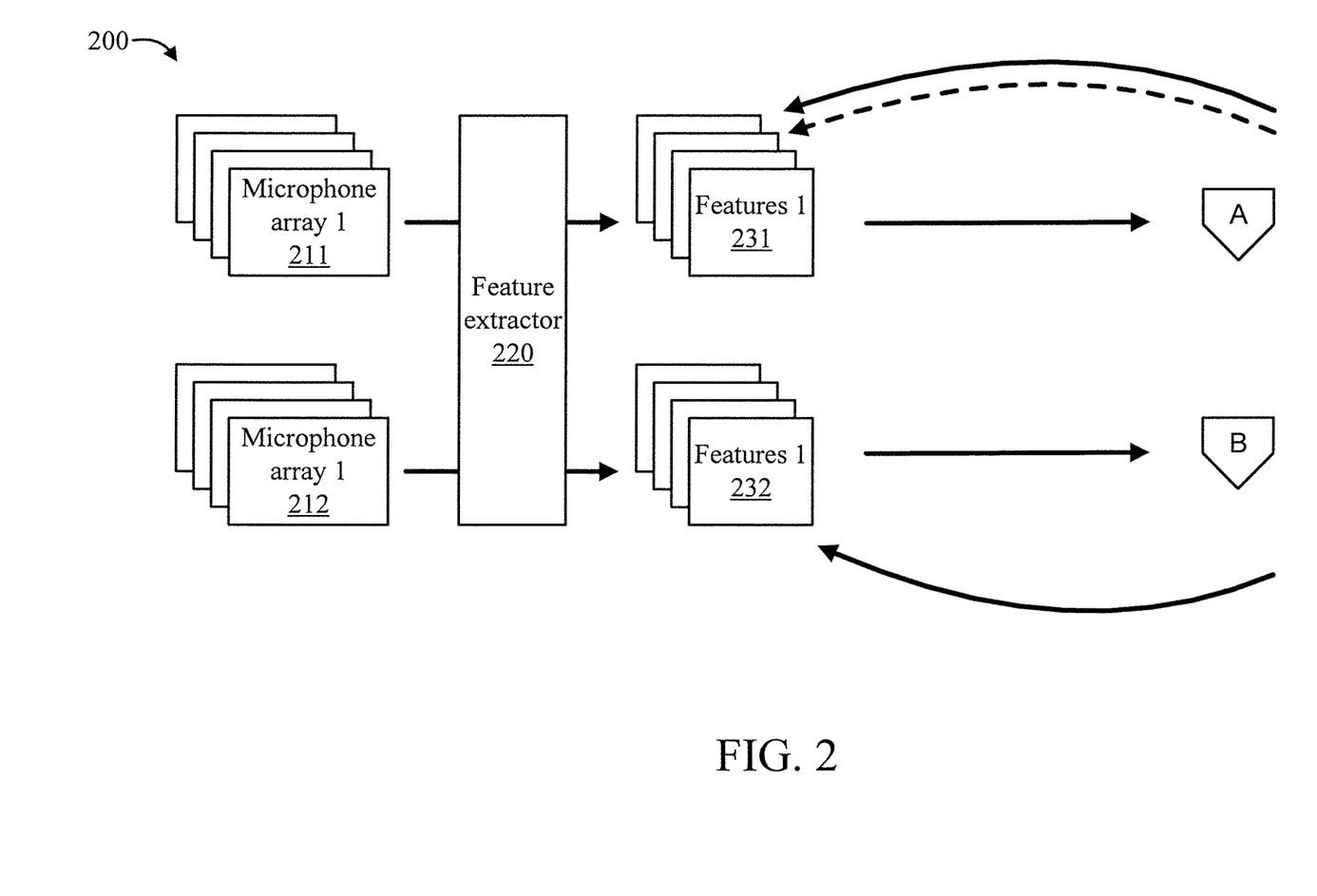
FIGS. 2-3 are block diagrams showing an exemplary architecture for sound source localization, in accordance with an embodiment of the present invention.
Figure 3:
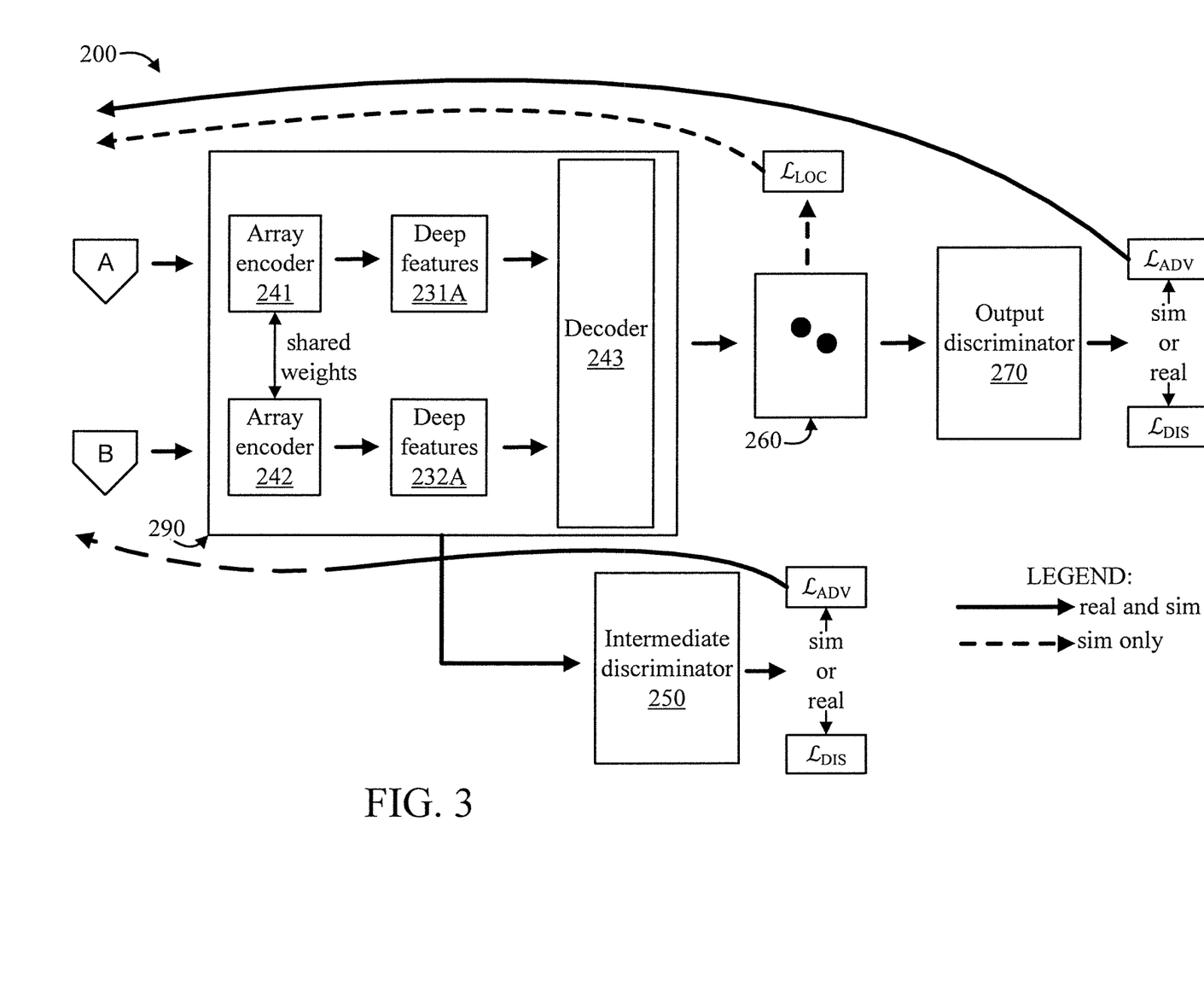

FIGS. 2-3 are block diagrams showing an exemplary architecture 200 for sound source localization, in accordance with an embodiment of the present invention.

The architecture 200 includes a raw sound microphone array 211, a raw sound microphone array 212, a feature extractor 220, a set of spectral features 231, a set of spectral features 232, an array encoder 241, an array encoder 242, a decoder 243, an intermediate discriminator 250, a localization heatmap 260, and an output discriminator 270. The encoders 241 and 242 and the decoder 243 are part of a deep neural network 290.

The feature extractor 220 is applied to the raw sound microphone array 211 to obtain the set of spectral features 231. The feature extractor 220 is also applied to the raw sound microphone array 212 to obtain the set of spectral features 232. In an embodiment, raw sound microphone array 211 and raw sound microphone array 212 may respectively include data from different domains (e.g., real versus simulated (sim)). During training data collection, the sound inputs can either be from an acoustic simulator or real data.

The array encoder 241 encodes the set of spectral feature 231 into a set of deep features 231A, and the array encoder 242 encodes the set of spectral features 232 into a set of deep features 232A, while sharing weights between the array encoder 241 and the array encoder 242. The weight parameters between two or more encoders can be shared responsive to the two or more microphones arrays sharing geometrical properties and being placed in locations with similar reverberation signatures. As used herein, the term "sharing weights" means two or more array encoders use a common neural network layer. In other words, the features of two or more microphone arrays can be passed to the same encoder. As used herein, the term "sharing geometrical properties" means having the same spatial arrangement. Thus, in contrast to feeding all of the features into the deep network 290 at once, this approach allows the deep network 290 to generalize better, particularly when the amount of training data is limited. This is because there are less variables (weights) of the neural network to be trained, given a fixed amount of training data.

The intermediate discriminator 250 adapts the latent features to be indistinguishable between (real and simulated) domains before being applied to the decoder 243. In an embodiment, the intermediate discriminator 250 uses an intermediate discriminator loss that involves both an adversarial loss $\mathcal{L}_{ADV}$ and a discriminator loss $\mathcal{L}_{DIS}$. Losses $\mathcal{L}_{ADV}$ and $\mathcal{L}_{DIS}$ both involve real and simulation (sim) data. $\mathcal{L}_{DIS}$ is computed first by classifying if the data is simulation or real and this is computed using the binary cross entropy so that $\mathcal{L}_{DIS} = -y_{DIS} \log x_{DIS} - (1-y_{DIS})\log(1-x_{DIS})$, where $x_{DIS}$ is the output of the discriminator and $y_{DIS}$ is 1 if the data is from simulation and 0 if it is real. $\mathcal{L}_{DIS}$ is only used to update the parameters of the discriminator 250. $\mathcal{L}_{ADV}$ is then computed from $\mathcal{L}_{DIS}$ by switching the labels of the simulated and real data. This loss is used to update the parameters of the array encoders 241 and 242.

The decoder 243 jointly decodes the sets of deep features 231A and 232A to output a localization heatmap 260, indicative of sound source localization, for each of labeled simulation data and unlabeled real data. Thus, the localization heatmap 260 includes at least one location representation. In an embodiment, the at least one location representation includes a two-dimensional position of the one or more sound sources. In an embodiment, the one or more sound sources include at least two simultaneous sound sources. In the embodiment shown in FIGS. 2-3, two simultaneous sound sources have been localized. In an embodiment, a localization loss $\mathcal{L}_{LOC}$ is calculated by the NN 290 with respect to the heatmap 260. In particular, the localization loss $\mathcal{L}_{LOC}$ is calculated from simulation data and its corresponding localization labels. For example, $\mathcal{L}_{LOC}=$ $$\sum \frac{(x_{LOC} - y_{LOC})^2}{n},$$

where $x_{LOC}$ is the output localization heatmap, $y_{LOC}$ is the ground truth labels of the localization heatmap and n is the number of cells in the heatmap grid.

The output discriminator 270 adapts the heatmap 260 to be indistinguishable between (real and simulated) domains. In an embodiment, the output discriminator 270 uses an output discriminator loss that involves both an adversarial loss $\mathcal{L}_{ADV}$ and a discriminator loss $\mathcal{L}_{DIS}$. $\mathcal{L}_{DIS}$ is computed first by classifying if the data is simulation or real and this is computed using the binary cross entropy. $\mathcal{L}_{DIS}$ is only used to update the parameters of the discriminator 270. $\mathcal{L}_{ADV}$ is then computed from $\mathcal{L}_{DIS}$, for example by switching the labels of the simulated and real data. This loss is used to update the parameters of the decoder 243 and the array encoders 241 and 242.

The discriminators 250 and 270 can be implemented using the same or respective neural networks. Each of the discriminators 250 and 270 can be fully connected networks or have more complex architectures such as, for example, but not limited to, convolutional Neural Networks (NNs), Recurrent Neural Networks, or networks resulting from neural architecture search (NAS).

Figure 4:
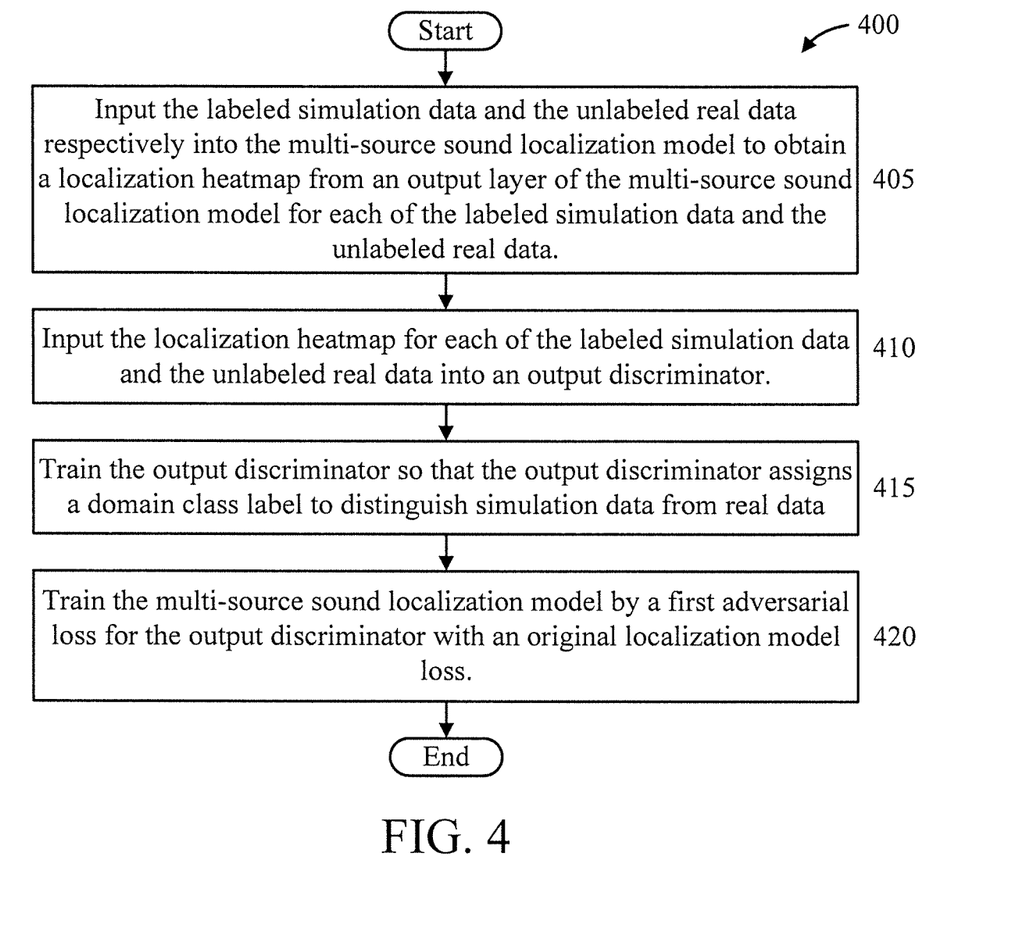
FIG. 4 is a flow diagram showing an exemplary method for training a multi-source sound localization model, in accordance with an embodiment of the present invention.
Figure 5:
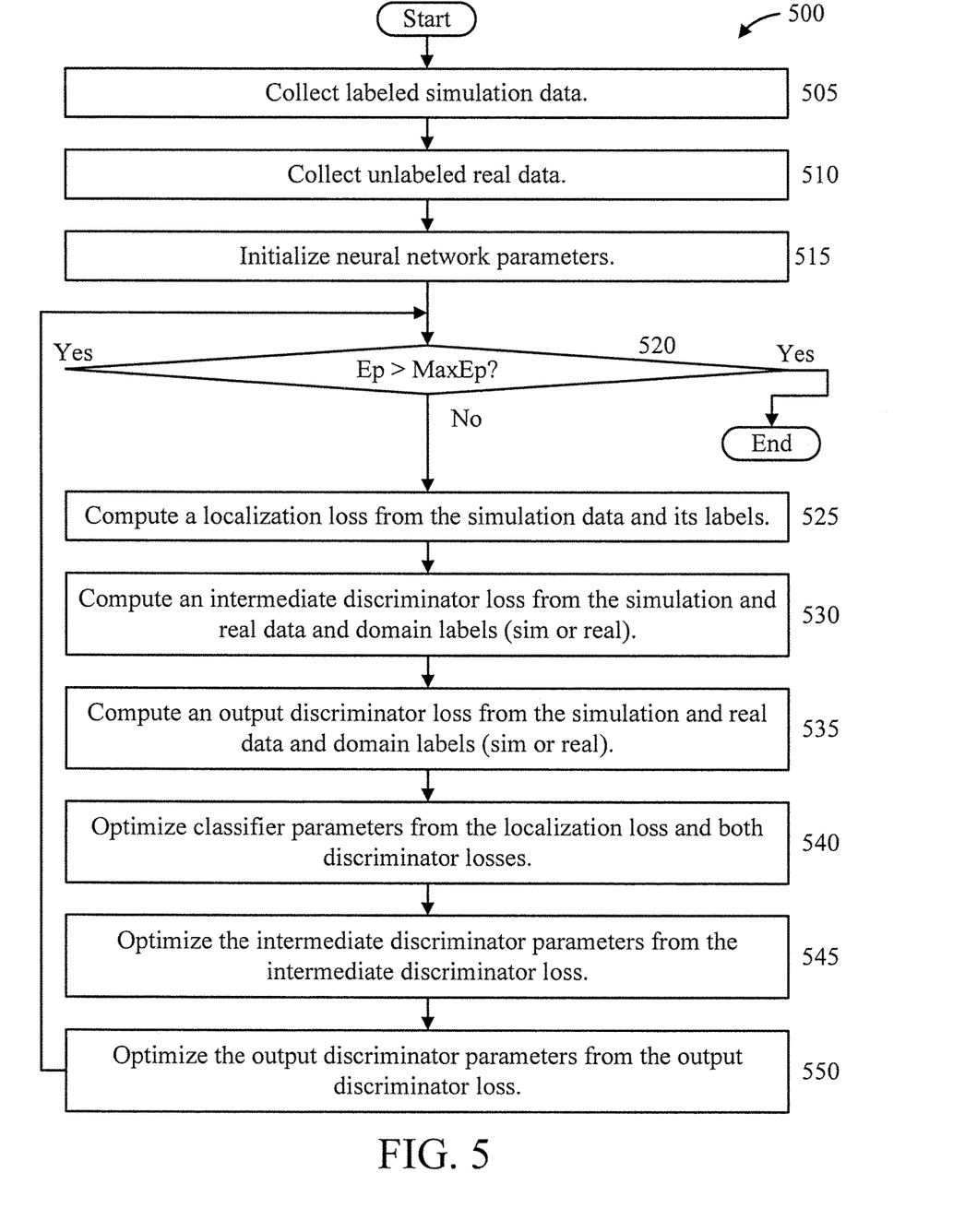
FIG. 5 is a flow diagram showing another exemplary method for training a multi-source sound localization model, in accordance with an embodiment of the present invention.
Figure 6:
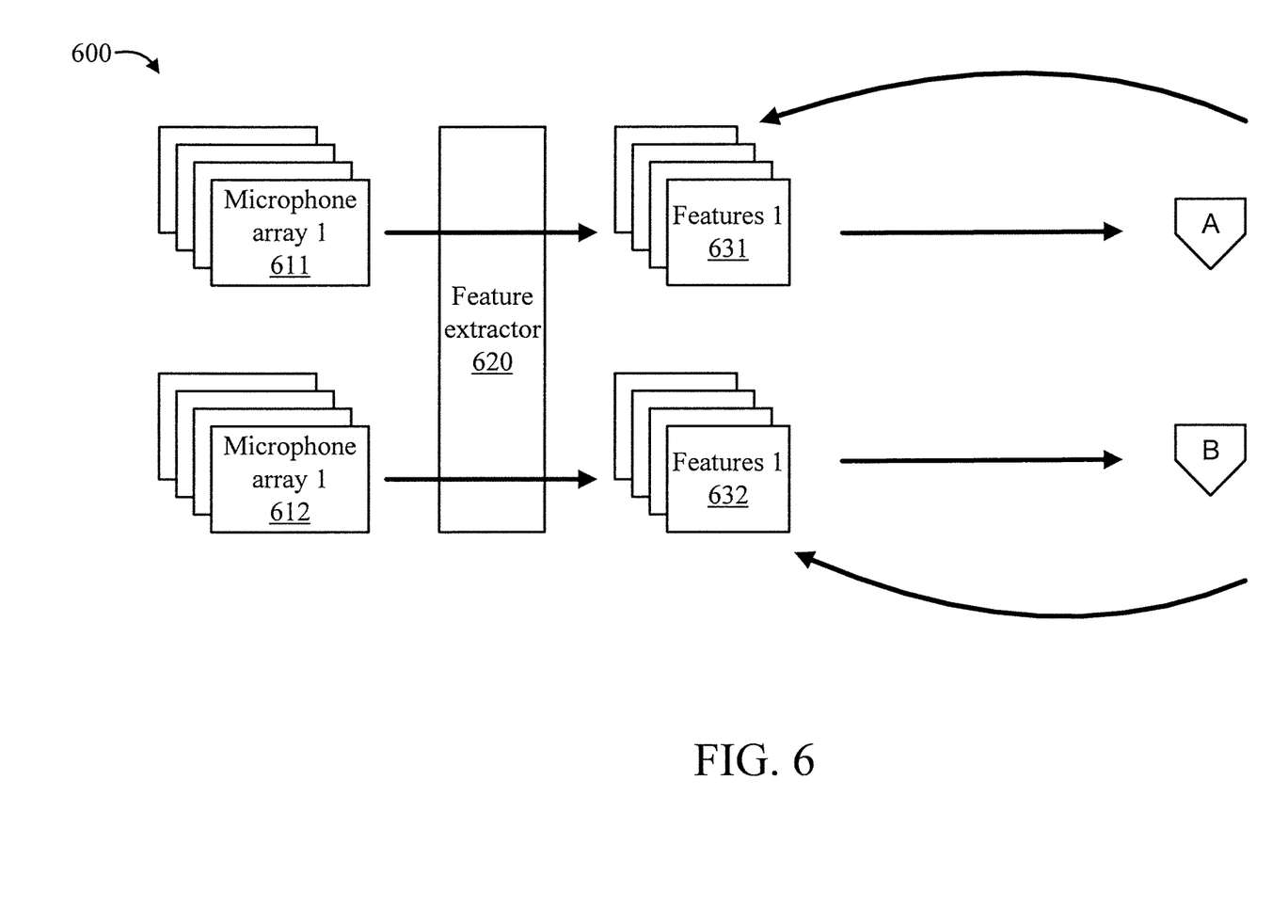
FIGS. 6-7 are block diagrams showing another exemplary architecture for sound source localization, in accordance with an embodiment of the present invention.

FIGS. 4 and 5-6 are respective flow diagrams showing various methods for training a multi-source sound localization model. The methods differ in their use of loss in order to train the multi-source sound localization model.

FIG. 4 is a flow diagram showing an exemplary method 400 for training a multi-source sound localization model, in accordance with an embodiment of the present invention.

At block 405, input the labeled simulation data and the unlabeled real data respectively into the multi-source sound localization model to obtain a localization heatmap from an output layer of the multi-source sound localization model for each of the labeled simulation data and the unlabeled real data.

At block 410, input the localization heatmap for each of the labeled simulation data and the unlabeled real data into an output discriminator.

At block 415, train the output discriminator so that the output discriminator assigns a domain class label to distinguish simulation data from real data.

At block 420, train the multi-source sound localization model by a first adversarial loss for the output discriminator with an original localization model loss.

The trained model can then be applied to real input data in order to generate a prediction (classification).

FIG. 5 is a flow diagram showing another exemplary method 500 for training a multi-source sound localization model, in accordance with an embodiment of the present invention.

At block 505, collect labeled simulation data.
At block 510, collect unlabeled real data.
At block 515, initialize neural network parameters.
At block 520, determine whether EP>MaxEP, where EP indicate the current epoch number and MaxEP indicates the maximum epoch number. If so, then proceed to block 525. Otherwise, terminate the method.

At block 525, compute a localization loss from the simulation data and its labels.

At block 530, compute an intermediate discriminator loss from the simulation and real data and domain labels (sim or real).

At block 535, compute an output discriminator loss from the simulation and real data and domain labels (sim or real).

At block 540, optimize classifier parameters from the localization loss and both discriminator losses.

At block 545, optimize the intermediate discriminator parameters from the intermediate discriminator loss.

At block 550, optimize the output discriminator parameters from the output discriminator loss.

Figure 7:
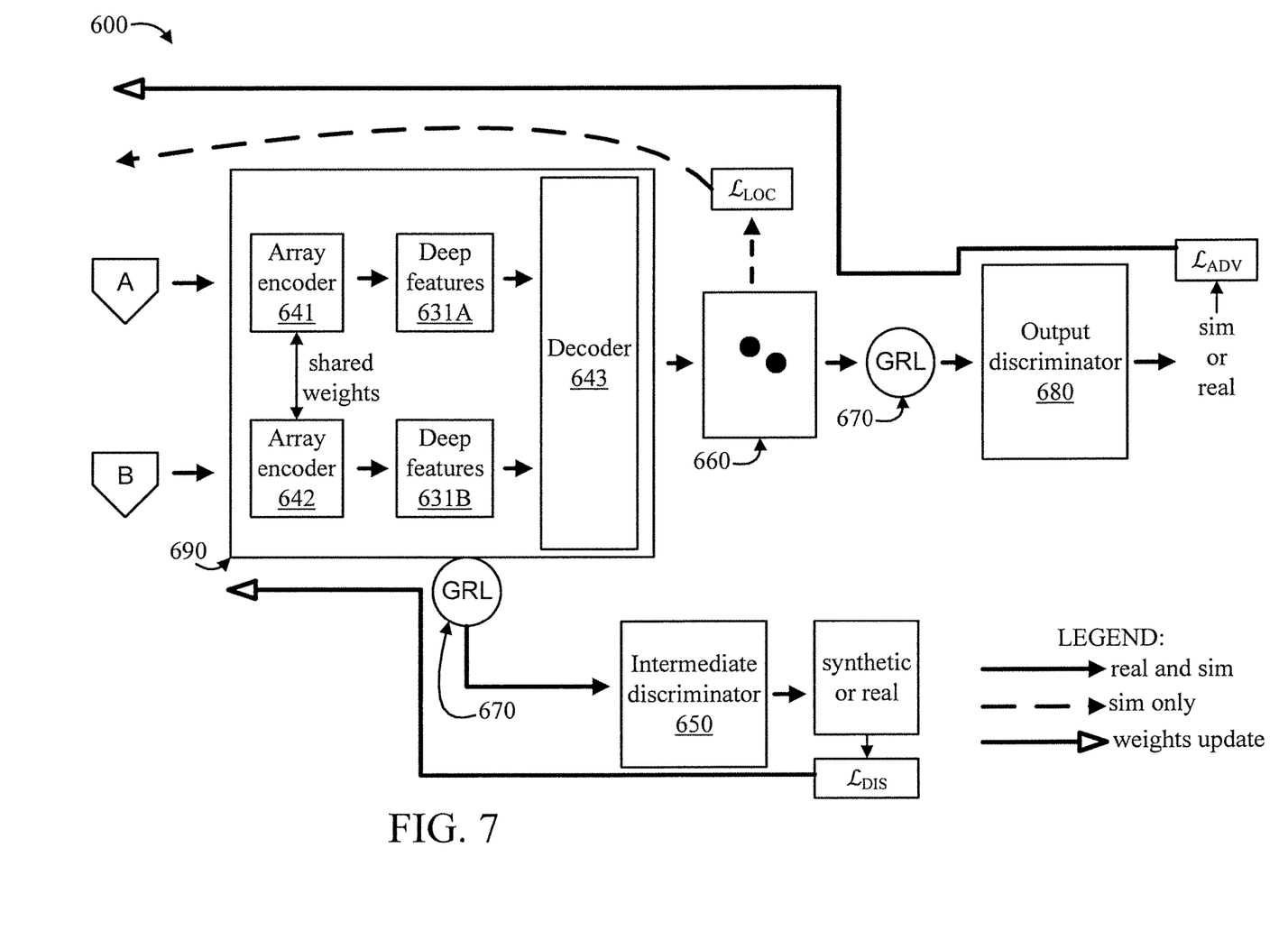

FIGS. 6-7 are block diagrams showing another exemplary architecture 600 for sound source localization, in accordance with an embodiment of the present invention. The architecture 600 differs from that of architecture 200 of FIGS. 2-4 in that architecture 600 is applied to a Data associated recurrent Neural Network (DaNN).

The architecture 600 includes a raw sound microphone array 611, a raw sound microphone array 612, a feature extractor 620, a set of spectral features 631, a set of spectral features 632, an array encoder 641, an array encoder 642, a decoder 643, an intermediate discriminator 650, a localization heatmap 660, and a Gradient Reversal Layer (GRL) 670. The encoders 641 and 642 and the decoder 643 are part of a deep neural network 690.

The feature extractor 620 is applied to the raw sound microphone array 611 to obtain the set of spectral features 631. The feature extractor 620 is also applied to the raw sound microphone array 612 to obtain the set of spectral features 632. In an embodiment, raw sound microphone array 611 and raw sound microphone array 612 may respectively include data from different domains (e.g., real versus simulated (sim)).

The array encoder 641 encodes the set of spectral feature 631 into a set of deep features 631A, and the array encoder 642 encodes the set of spectral features 632 into a set of deep features 632A, while sharing weights between the array encoder 641 and the array encoder 642. The weight parameters between two or more encoders can be shared responsive to the two or more microphones arrays sharing geometrical properties and being placed in locations with similar reverberation signatures. As used herein, the term "sharing weights" means two or more array encoders use a common neural network layer. In other words, the features of two or more microphone arrays can be passed to the same encoder. As used herein, the term "sharing geometrical properties" means having the same spatial arrangement. Thus, in contrast to feeding all of the features into the deep network 690 at once, this approach allows the deep network 690 to generalize better, particularly when the amount of training data is limited. This is because there are less variables (weights) of the neural network to be trained, given a fixed amount of training data.

The Gradient Reversal Layer (GRL) 670 is a layer that does nothing in the forward propagation phase but negates the gradients during backpropagation.

The intermediate discriminator 650 adapts the latent features to be indistinguishable between (real and simulated) domains before being applied to the decoder 643. In an embodiment, the intermediate discriminator 650 uses an intermediate discriminator loss $\mathcal{L}_{DIS}$ that is computed first by classifying if the data is simulation or real and this is computed using the binary cross entropy.

The decoder 643 jointly decodes the sets of deep features 631A and 632A to output a localization heatmap 660, indicative of sound source localization, for each of labeled simulation data and unlabeled real data. Thus, the localization heatmap 660 includes at least one location representation. In an embodiment, the at least one location representation includes a two-dimensional position of the one or more sound sources. In an embodiment, the one or more sound sources include at least two simultaneous sound sources. In the embodiment shown in FIGS. 6-7, two simultaneous sound sources have been localized. In an embodiment, a localization loss $\mathcal{L}_{LOC}$ is calculated by the NN 690 with respect to the heatmap 660. In particular, the localization loss $\mathcal{L}_{LOC}$ is calculated from simulation data and its corresponding localization labels.

The output discriminator 680 adapts the heatmap 660 to be indistinguishable between (real and simulated) domains. In an embodiment, the output discriminator 680 uses an intermediate discriminator loss $\mathcal{L}_{DIS}$ that is computed first by classifying if the data is simulation or real and this is computed using the binary cross entropy.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
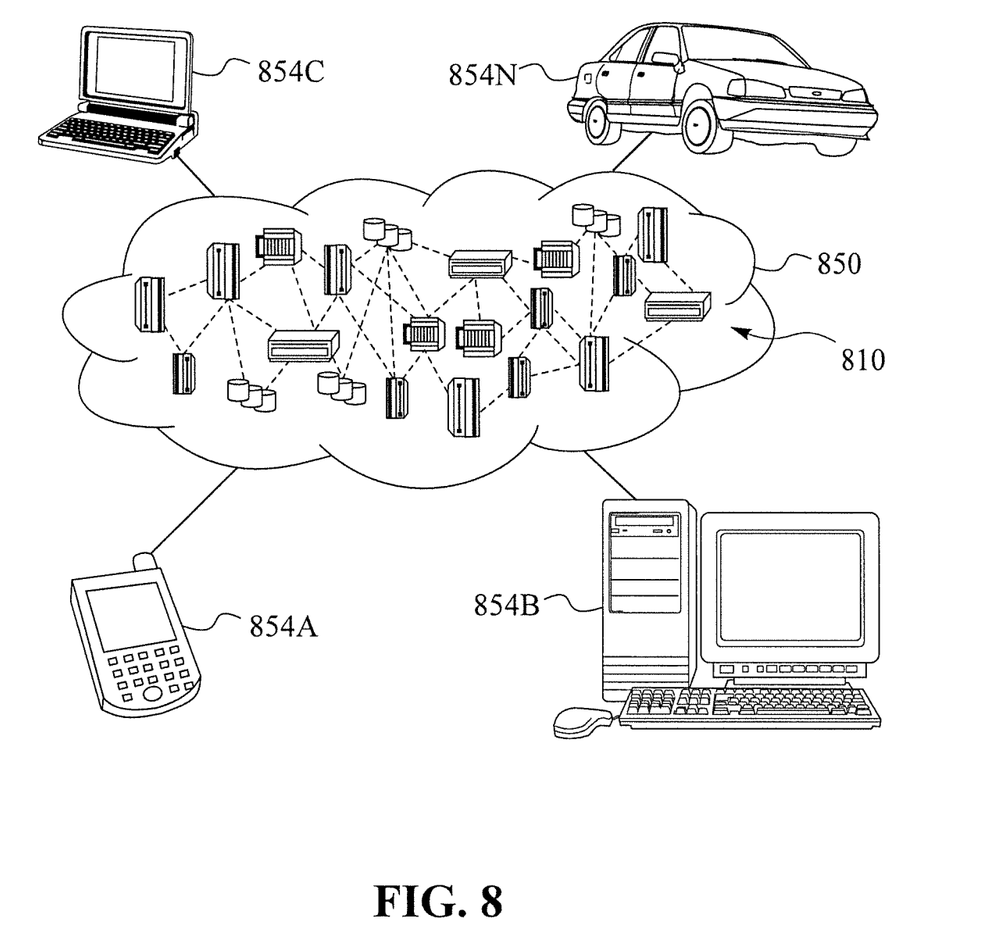
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
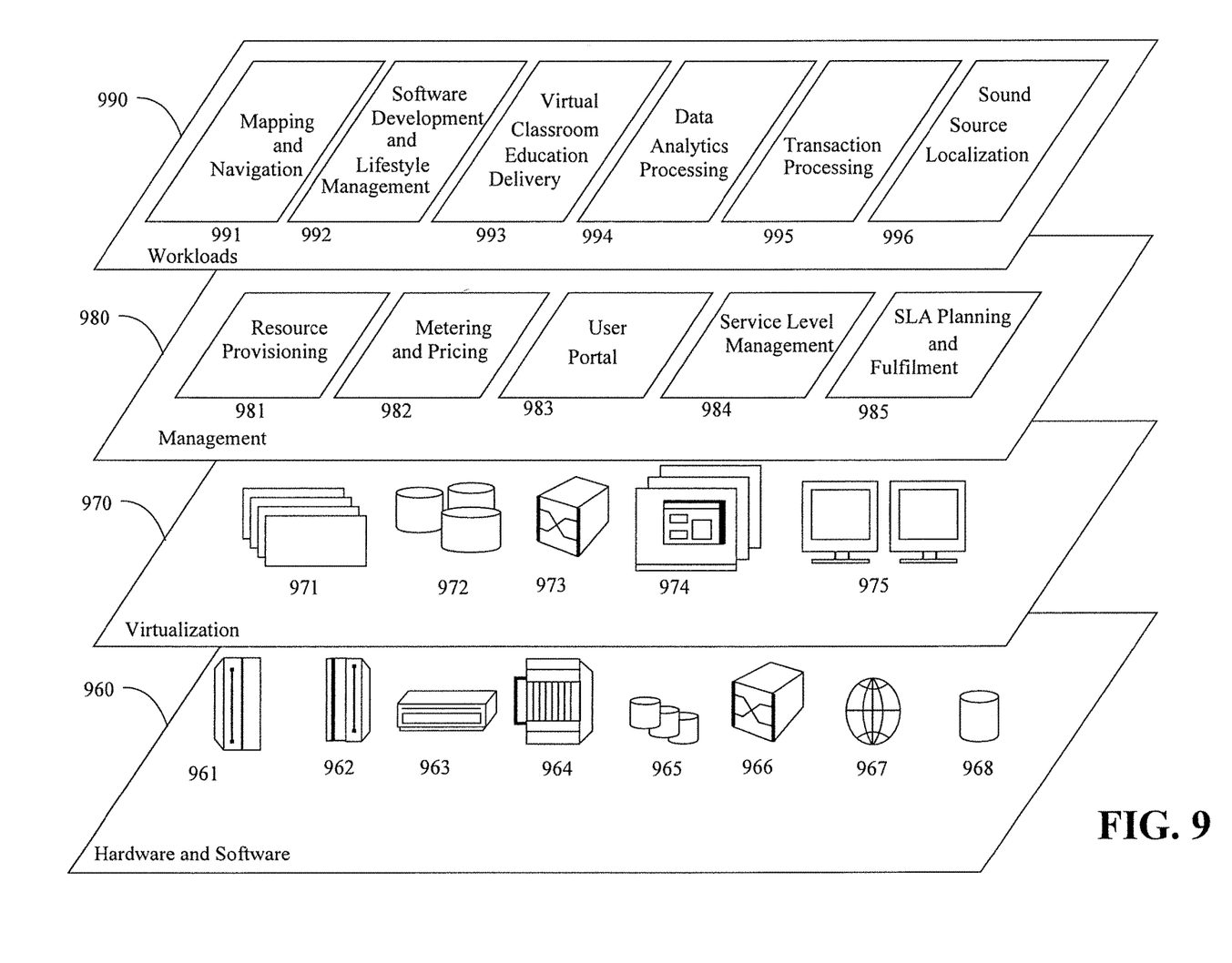
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and Sound Source Localization (SSL) 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for training a multi-source sound localization model using labeled simulation acoustic data and unlabeled real acoustic data, the method comprising:

inputting the labeled simulation acoustic data and the unlabeled real acoustic data respectively into a multi-source sound localization model of a neural network to obtain a localization heatmap from an output layer of the multi-source sound localization model for each of the labeled simulation acoustic data and the unlabeled real acoustic data, the localization heatmap including a two-dimensional position of one or more sound sources;

inputting the localization heatmap for each of the labeled simulation acoustic data and the unlabeled real acoustic data into an output discriminator;

training the output discriminator so that the output discriminator assigns a domain class label to distinguish simulation acoustic data from real acoustic data;

training, by a hardware process, the multi-source sound localization model by a first adversarial loss for the output discriminator with an original localization model loss;

obtaining feature data from an intermediate layer of the multi-source sound localization model for each of the labeled simulation data and the unlabeled real data;

inputting the feature data for each of the labeled simulation acoustic data and the unlabeled real acoustic data into an intermediate discriminator; and training the intermediate discriminator to assign a domain class label to distinguish simulation acoustic data from real acoustic data, wherein the training the multi-source sound localization model includes training the multi-source sound localization model by the first adversarial loss for the output discriminator and a second adversarial loss for the intermediate discriminator with the original localization model loss.

2. The computer-implemented method of claim 1, wherein the neural network includes a plurality of encoders whose weights are shared between each of two sound sources.

3. The computer-implemented method of claim 1, wherein the neural network includes only one decoder and further includes a respective encoder for each of the two or more microphone arrays to form a plurality of encoders, wherein the plurality of encoders share weight parameters therebetween.

4. The computer-implemented method of claim 1, further comprising applying the trained neural network to the one or more sound sources to obtain at least one location representation of the one or more sound sources.

5. The computer-implemented method of claim 4, further comprising using the at least one location representation of the one or more sound sources to classify the one or more sound sources.

6. The computer-implemented method of claim 4, further comprising displaying the at least one location representation on a display device.

7. The computer-implemented method of claim 1, wherein the neural network is a Data associated recurrent Neural Network.

8. The computer-implemented method of claim 1, wherein the original localization model loss is calculated from the labeled simulation data and the unlabeled real data and from at least one of simulation domain labels and real domain labels.

9. The computer-implemented method of claim 1, further comprising negating, by a gradient reversal layer coupled to the output discriminator, gradients during a backpropagation process.

10. The computer implemented method of claim 1, further comprising updating parameters of the output discriminator using a discriminator loss.

11. The computer-implemented method of claim 10, wherein the discriminator loss is calculated by classifying whether data to be used is the labeled simulation data or the unlabeled real data using binary cross entropy.

12. The computer-implemented method of claim 10, wherein the adversarial loss is calculated from the discriminator loss by switching labels of the labeled simulation data and the unlabeled real data.

13. The computer-implemented method of claim 12, wherein the neural network includes a plurality of encoders whose weights are shared between each of two sound sources, and further includes a decoder, and wherein the adversarial loss is used to update the parameters of the plurality of encoders and the decoder.

14. A computer program product for training a multi-source sound localization model using labeled simulation acoustic data and unlabeled real acoustic data, the computer program product comprising a non-transitory computer readable storage medium having program instructions embodied therewith, the program instructions executable by a computer to cause the computer to perform a method comprising:

inputting the labeled simulation acoustic data and the unlabeled real acoustic data respectively into a multi-source sound localization model of a neural network to obtain a localization heatmap from an output layer of the multi-source sound localization model for each of the labeled simulation acoustic data and the unlabeled real acoustic data, the localization heatmap including a two-dimensional position of one or more sound sources;

inputting the localization heatmap for each of the labeled simulation acoustic data and the unlabeled real acoustic data into an output discriminator;

training the output discriminator so that the output discriminator assigns a domain class label to distinguish simulation acoustic data from real data; and training the multi-source sound localization model by a first adversarial loss for the output discriminator with an original localization model loss;

obtaining feature data from an intermediate layer of the multi-source sound localization model for each of the labeled simulation data and the unlabeled real data;

inputting the feature data for each of the labeled simulation acoustic data and the unlabeled real acoustic data into an intermediate discriminator; and training the intermediate discriminator to assign a domain class label to distinguish simulation acoustic data from real acoustic data, wherein the training the multi-source sound localization model includes training the multi-source sound localization model by the first adversarial loss for the output discriminator and a second adversarial loss for the intermediate discriminator with the original localization model loss.

15. The computer-implemented method of claim 14, wherein the original localization model loss is calculated from the labeled simulation acoustic data and the unlabeled real acoustic data and from at least one of simulation domain labels and real domain labels.

16. The computer implemented method of claim 14, further comprising updating parameters of the output discriminator using a discriminator loss.

17. The computer-implemented method of claim 16, wherein the discriminator loss is calculated by classifying whether data to be used is the labeled simulation acoustic data or the unlabeled real acoustic data using binary cross entropy.

18. The computer-implemented method of claim 16, wherein the adversarial loss is calculated from the discriminator loss by switching labels of the labeled simulation data and the unlabeled real data.

19. A computer processing system for training a multi-source sound localization model using labeled simulation acoustic data and unlabeled real acoustic data, comprising:

a memory device including program code stored thereon; and a hardware processor, operatively coupled to the memory device, and configured to run the program code stored on the memory device to input the labeled simulation acoustic data and the unlabeled real acoustic data respectively into a multi-source sound localization model of a neural network to obtain a localization heatmap from an output layer of the multi-source sound localization model for each of the labeled simulation acoustic data and the unlabeled real acoustic data, the localization heatmap including a two-dimensional position of one or more sound sources;

input the localization heatmap for each of the labeled simulation acoustic data and the unlabeled real acoustic data into an output discriminator;

train the output discriminator so that the output discriminator assigns a domain class label to distinguish simulation acoustic data from real data; and train the multi-source sound localization model by a first adversarial loss for the output discriminator with an original localization model loss;

obtain feature data from an intermediate layer of the multi-source sound localization model for each of the labeled simulation data and the unlabeled real data;

input the feature data for each of the labeled simulation acoustic data and the unlabeled real acoustic data into an intermediate discriminator; and train the intermediate discriminator to assign a domain class label to distinguish simulation acoustic data from real acoustic data, wherein the training the multi-source sound localization model includes training the multi-source sound localization model by the first adversarial loss for the output discriminator and a second adversarial loss for the intermediate discriminator with the original localization model loss.

\* \* \* \* \*